US009546427B2

(12) United States Patent
Lumetta

(10) Patent No.: US 9,546,427 B2
(45) Date of Patent: Jan. 17, 2017

(54) SYSTEM AND METHOD FOR GENERATING A CHLORINE-CONTAINING COMPOUND

(76) Inventor: Michael Lumetta, Lake Orion, MI (US)

( * ) Notice: Subject to any disclaimer, the term of this patent is extended or adjusted under 35 U.S.C. 154(b) by 194 days.

(21) Appl. No.: 14/124,901

(22) PCT Filed: Jun. 8, 2012

(86) PCT No.: PCT/US2012/041487
§ 371 (c)(1),
(2), (4) Date: Jan. 20, 2014

(87) PCT Pub. No.: WO2012/170774
PCT Pub. Date: Dec. 13, 2012

(65) Prior Publication Data
US 2014/0202871 A1 Jul. 24, 2014

Related U.S. Application Data

(60) Provisional application No. 61/495,671, filed on Jun. 10, 2011.

(51) Int. Cl.
C02F 1/461 (2006.01)
C25B 9/08 (2006.01)
C25B 1/26 (2006.01)
C25B 9/18 (2006.01)
C25B 15/02 (2006.01)
C02F 1/467 (2006.01)

(52) U.S. Cl.
CPC .............. C25B 1/26 (2013.01); C02F 1/4674 (2013.01); C02F 1/46104 (2013.01); C25B 9/08 (2013.01); C25B 9/18 (2013.01); C25B 15/02 (2013.01); C02F 2001/46133 (2013.01); C02F 2201/46115 (2013.01); C02F 2201/46125 (2013.01); C02F 2201/46145 (2013.01); C02F 2209/29 (2013.01)

(58) Field of Classification Search
None
See application file for complete search history.

(56) References Cited

U.S. PATENT DOCUMENTS 3,438,879 A    4/1969  Kircher et al.
3,616,385 A   10/1971  Kloss et al.
3,893,902 A *  7/1975  Loftfield ............... C02F 1/4674
                                                     205/350
3,897,320 A *  7/1975  Cook, Jr. .................. C25B 1/34
                                                     204/257

(Continued)

OTHER PUBLICATIONS

PCT/US2012/041487 International Search Report dated Nov. 28, 2012, 4 pages.

Primary Examiner — Harry D Wilkins, III
(74) Attorney, Agent, or Firm — Warner Norcross & Judd LLP

(57) ABSTRACT

A system (10) for generating a chlorine-containing compound includes an anodic chamber (12), a cathodic chamber (20), and a brine chamber (30). The anodic chamber (12) includes an anodic electrode (14) and the cathodic chamber (20) includes a cathodic electrode (22). A membrane (28) separates the anodic and cathodic chambers (12), (20). The brine chamber (30) includes an anodic electrode (32) and a cathodic electrode (34). Concentration and type of the chlorine-containing compound can be selectively and consistently controlled by the system (10) in real time.

8 Claims, 4 Drawing Sheets

(56) References Cited

U.S. PATENT DOCUMENTS

| | | | | |
|---|---|---|---|---|
| 4,140,615 A | * | 2/1979 | Kadija | C25B 1/46 204/266 |
| 4,242,184 A | | 12/1980 | Ford | |
| 4,285,795 A | * | 8/1981 | Cook, Jr. | C25B 1/46 204/266 |
| 4,405,418 A | * | 9/1983 | Takemura | C25B 1/46 204/232 |
| 4,484,991 A | | 11/1984 | Angelo | |
| 4,767,511 A | | 8/1988 | Aragon | |
| 4,790,946 A | | 12/1988 | Jansen | |
| 4,839,004 A | | 6/1989 | Castellini | |
| 5,037,519 A | | 8/1991 | Wiscombe | |
| 5,174,868 A | * | 12/1992 | Lipsztajn | C25B 1/26 205/556 |
| 5,221,451 A | | 6/1993 | Seneff et al. | |
| 5,322,677 A | | 6/1994 | Shaffer et al. | |
| 5,419,818 A | * | 5/1995 | Wanngard | C25B 1/265 205/503 |
| 5,445,722 A | | 8/1995 | Yamaguti et al. | |
| 5,466,347 A | * | 11/1995 | Shimamune | C25B 1/46 205/345 |
| 5,565,082 A | | 10/1996 | Nakamatsu et al. | |
| 5,674,537 A | | 10/1997 | Morrow | |
| 5,932,171 A | | 8/1999 | Malchesky | |
| 5,954,939 A | | 9/1999 | Kanekuni et al. | |
| 6,126,810 A | | 10/2000 | Fricker et al. | |
| 6,143,163 A | | 11/2000 | Sawamoto et al. | |
| 6,174,419 B1 | | 1/2001 | Akiyama | |
| 6,217,741 B1 | | 4/2001 | Doi | |
| 6,231,747 B1 | | 5/2001 | Fukuzuka et al. | |
| 6,274,009 B1 | * | 8/2001 | Krafton | C25B 1/26 204/230.2 |
| 6,652,719 B1 | | 11/2003 | Tseng | |
| 6,719,891 B2 | | 4/2004 | Ruhr et al. | |
| 7,090,753 B2 | | 8/2006 | Sumita | |
| 7,270,736 B2 | | 9/2007 | Gobet et al. | |
| 7,303,660 B2 | | 12/2007 | Buckley et al. | |
| 2004/0060815 A1 | * | 4/2004 | Buckley | C02F 1/46104 204/230.2 |
| 2005/0183949 A1 | * | 8/2005 | Daly | C02F 1/46104 204/242 |
| 2005/0189237 A1 | * | 9/2005 | Sano | C02F 1/4618 205/746 |
| 2006/0054510 A1 | | 3/2006 | Salerno | |
| 2007/0138020 A1 | | 6/2007 | Balagopal et al. | |
| 2007/0141434 A1 | | 6/2007 | Joshi et al. | |
| 2007/0186368 A1 | | 8/2007 | Field et al. | |
| 2008/0003171 A1 | | 1/2008 | Smith et al. | |
| 2008/0264778 A1 | | 10/2008 | Joshi et al. | |
| 2010/0044241 A1 | | 2/2010 | Pendleton et al. | |
| 2011/0135562 A1 | | 6/2011 | Niksa | |

* cited by examiner

SYSTEM AND METHOD FOR GENERATING A CHLORINE-CONTAINING COMPOUND

CROSS-REFERENCE TO RELATED APPLICATIONS

This application is the National Stage of International Patent Application No. PCT/US2012/041487, filed on Jun. 8, 2012, which claims the benefit of U.S. Provisional Patent Application Ser. No. 61/495,671, filed on Jun. 10, 2011, which is incorporated herein by reference in its entirety.

BACKGROUND OF THE INVENTION

The subject invention generally relates to a system for generating a chlorine-containing compound and, more specifically, to a system and method for generating a chlorine-containing compound for disinfecting and/or sanitizing a substrate.

Chlorine-containing compounds are well known in the art and are utilized in various industries due to their unique physical properties. Most commonly, chlorine-containing compounds are utilized in cleaning applications. For example, hospitals, restaurants, and even households often employ various chlorine-containing compounds for disinfecting, bleaching, whitening, deodorizing, and/or otherwise cleaning substrates.

For example, one chlorine-containing compound is sodium hypochlorite (NaClO), which is utilized as a powerful disinfecting agent and/or a bleaching agent. Sodium hypochlorite is commonly referred to as bleach when disposed in water to form an aqueous sodium hypochlorite solution. Another chlorine-containing compound is hypochlorous acid (HClO), which is similarly utilized as a disinfecting agent.

Hypochlorous acid is a particularly desirable disinfecting agent due to the effect of hypochlorous acid on bacteria and its lack of adverse health impacts on humans. In particular, when in the presence of bacteria, hypochlorous acid penetrates the bacteria and reacts with key enzymes to prevent normal respiration. Additionally, hypochlorous acid effectively eradicates pathogens other than bacteria. Accordingly, hypochlorous acid is often utilized as a disinfecting agent for surgical tools or hands of a surgeon in hospitals, and is similarly utilized as a disinfecting agent for surfaces utilized in the preparation of food by restaurants.

However, hypochlorous acid has an incredibly short half life and readily oxidizes. Other factors further contribute to the incredibly short half life of hypochlorous acid, such as temperature, exposure to ultraviolet light, etc. Moreover, hypochlorous acid partially dissociates into a hypochlorite anion ($OCl^-$) when in an aqueous solution. As such, hypochlorous acid cannot be readily purchased and stored for any extended duration.

Accordingly, hypochlorous acid is generally generated in situ and utilized immediately upon being generated. However, conventional systems for generating hypochlorous acid in situ are large (and not portable) and very expensive. Moreover, conventional systems for generating hypochlorous acid in situ have outputs that are inconsistent. Specifically, conventional systems for generating hypochlorous acid in situ have outputs with varying pH, free available chlorine (FAC) and oxidation-reduction potential (ORP), which further limits repeatability and reproducibility of the conventional systems for generating hypochlorous acid in situ. Further, the free available chlorine (FAC) of the hypochlorous acid produced via conventional systems for generating hypochlorous acid is undesirably low, which limits the applications in which the hypochlorous acid may be utilized.

SUMMARY OF THE INVENTION AND ADVANTAGES

The subject invention provides a system for generating a chlorine-containing compound. The system includes an anodic chamber comprising an anodic electrode and having an inlet and an outlet. The system further includes a cathodic chamber spaced from and adjacent the anodic chamber. The cathodic chamber comprises a cathodic electrode and has an inlet and an outlet. A membrane is disposed between and separates the anodic chamber and the cathodic chamber of the system. The system also includes a brine chamber having an anodic electrode and a cathodic electrode spaced from the anodic electrode. The brine chamber of the system has an inlet for receiving a first aqueous salt solution and an outlet. Additionally, the system includes a first power supply coupled to and in electrical communication with the cathodic electrode of the cathodic chamber and the anodic electrode of the anodic chamber. A second power supply is coupled to and in electrical communication with the anodic and cathodic electrodes of the brine chamber in the system. The first and second power supplies may be the same as or different from one another. Finally, the system optionally includes a microprocessor coupled to and in electrical communication with at least one of the first and second power supplies for measuring and/or controlling amperage and/or potential difference between the anodic and cathodic electrodes of the brine chamber and/or the anodic electrode of the anodic chamber and the cathodic electrode of the cathodic chamber.

The outlet of the brine chamber is coupled to and in fluid communication with the inlet of the anodic chamber or the inlet of the cathodic chamber. The other of the inlet of the anodic chamber and the inlet of the cathodic chamber, i.e., the inlet which is not coupled to and in fluid communication with the outlet of the brine chamber, is for receiving a second aqueous salt solution. The first and second aqueous salt solutions may be the same as or different from one another.

The chlorine-containing compound is generated in one of the anodic chamber and the cathodic chamber and is recovered from one of the outlet of the anodic chamber and the outlet of the cathodic chamber.

The subject invention also provides a method of generating a chlorine-containing compound in the system. The method comprises the step of applying an electric potential difference between the anodic electrode of the anodic chamber and the cathodic electrode of the cathodic chamber via the first power supply. The method also comprises the step of applying an electric potential difference between the anodic and cathodic electrodes of the brine chamber via the second power supply. Finally, the method optionally comprises the step of measuring and/or controlling amperage and/or potential difference between the anodic and cathodic electrodes of the brine chamber and/or between the anodic electrode of the anodic chamber and the cathodic electrode of the cathodic chamber via the microprocessor to generate the chlorine-containing compound.

The system and method of the present invention generate the chlorine-containing compound in concentrations significantly greater than conventional systems and methods of producing chlorine-containing compounds. Further, the system of the present invention is much less expensive than conventional systems for producing chlorine-containing compounds despite the fact the system of the present invention desirably generates the chlorine-containing compounds in concentrations greater than those that have been achieved by conventional systems. Additionally, the system and method of the present invention can generate the chlorine-containing compound in situ such that the chlorine-containing compound may be generated on demand.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
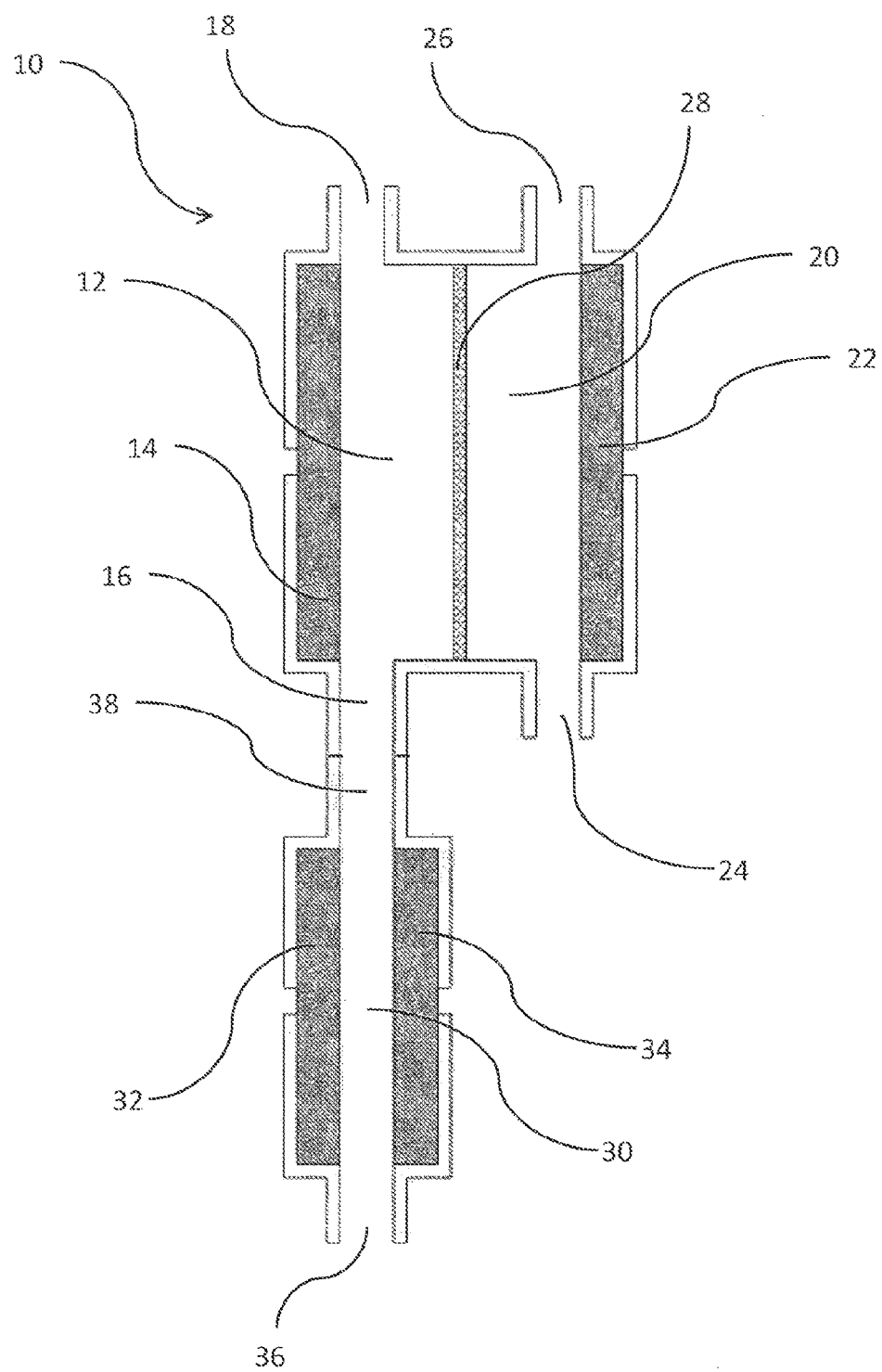
FIG. 1 is a schematic view of one embodiment of a system for generating a chlorine-containing compound according to the present invention.

Referring to the Figures, wherein like numerals indicate corresponding parts throughout the several views, a system for generating a chlorine-containing compound is generally shown at 10. The system 10 is particularly suitable for generating a chlorine-containing compound for disinfecting and/or sanitizing a substrate. However, the system 10 is suitable for generating a chlorine-containing compound for other applications, such as for sanitizing water for a pool, a hot tub, etc.

As introduced above, the system 10 is for generating a chlorine-containing compound. The chlorine-containing compound generated by the system 10 of the present invention may comprise any chlorine-containing compound having desirable physical properties, such as sanitizing and/or disinfecting properties. Typically, the chlorine-containing compound is selected from chlorine-containing compounds that may be generated from an aqueous salt solution, e.g. an aqueous sodium chloride (NaCl) solution, as described in greater detail below. Alternatively, the aqueous salt solution may be formed from other chlorine-containing salts. For example, the aqueous salt solution may comprise an aqueous calcium chloride ($CaCl_2$) solution, an aqueous magnesium chloride ($MgCl_2$) solution, an aqueous potassium chloride (KCl) solution, etc., or combinations of such solutions. Exemplary examples of chlorine-containing compounds which may be generated by the system 10 from the aqueous salt solution include, but are not limited to, hypochlorous acid (HClO), hydrochloric acid (HCl), and sodium hypochlorite (NaClO). In certain embodiments, the chlorine-containing compound generated by the system 10 comprises hypochlorous acid (HClO). In other embodiments, the chlorine-containing compound generated by the system 10 comprises hydrochloric acid (HCl). In further embodiments, the chlorine-containing compound generated by the system 10 comprises sodium hypochlorite (NaClO).

The system 10 comprises an anodic chamber 12. The anodic chamber 12 of the system 10 comprises an anodic electrode 14, as described in greater detail below. Additionally, the anodic chamber 12 of the system 10 has an inlet 16 and an outlet 18. The anodic chamber 12 of the system 10 may have any uniform or non-uniform shape and may have any dimensions depending upon the desired size and shape of the system 10. Similarly, the inlet 16 and the outlet 18 of the anodic chamber 12 may have various configurations, shapes, and dimensions. Typically, the inlet 16 and the outlet 18 of the anodic chamber 12 have substantially identical dimensions to allow for consistent fluid flow in the inlet 16 and out of the outlet 18 of the anodic chamber 12. The anodic chamber 12 typically comprises a polymeric material, which houses the anodic electrode 14 and defines the inlet 16 and the outlet 18. Exemplary examples of the polymeric material of the anodic chamber 12 include, but are not limited to, acrylonitrile butadiene styrene (ABS), polystyrene, polyvinylchloride, polycarbonate, etc.

The system 10 further comprises a cathodic chamber 20. The cathodic chamber 20 of the system 10 is spaced from and adjacent the anodic chamber 12. The cathodic chamber 20 of the system 10 comprises a cathodic electrode 22, as described in greater detail below. Additionally, the cathodic chamber 20 of the system 10 has an inlet 24 and an outlet 26. Like the anodic chamber 12, the cathodic chamber 20 of the system 10 may have any uniform or non-uniform shape and may have any dimensions depending upon the desired size and shape of the system 10. Typically, the cathodic chamber 20 and the anodic chamber 12 have dimensions such that a volume of the cathodic chamber 20 and a volume of the anodic chamber 12 are substantially identical. However, the volume of the cathodic chamber 20 may be larger or smaller than the volume of the anodic chamber 12. Similarly, the cathodic chamber 20 and the anodic chamber 12 may have shapes different from one another, or shapes similar or identical to one another. Further, the inlet 24 and the outlet 26 of the cathodic chamber 20 may have various configurations, shapes, and dimensions. Typically, the inlet 24 and the outlet 26 of the cathodic chamber 20 have substantially identical dimensions to allow for consistent fluid flow in the inlet 24 and out of the outlet 26 of the cathodic chamber 20. The cathodic chamber 20 typically comprises a polymeric material, which houses the cathodic electrode 22 and defines the inlet 24 and the outlet 26. The cathodic chamber 20 may comprise the same polymeric material as the anodic chamber 12 or may comprise polymeric material different from the polymeric material of the anodic chamber 12. Exemplary examples of the polymeric material of the cathodic chamber 20 include, but are not limited to, acrylonitrile butadiene styrene (ABS), polystyrene, polyvinylchloride, polycarbonate, etc.

The anodic electrode 14 of the anodic chamber 12 of the system 10 and the cathodic electrode 22 of the cathodic chamber 20 of the system 10 may independently comprise any conductive or semi-conductive material. Generally, the anodic electrode 14 of the anodic chamber 12 of the system 10 and the cathodic electrode 22 of the cathodic chamber 20 of the system 10 are independently selected from metals, semi-metals, metal alloys, conductive or semi-conductive composites, and combinations thereof. Specific examples of exemplary conductive and/or semi-conductive materials suitable for the purposes of the anodic electrode 14 of the anodic chamber 12 and the cathodic electrode 22 of the cathodic chamber 20 include, but are not limited to, graphite, titanium, titanium alloys, nickel, nickel alloys, steel, and steel alloys. In certain embodiments, at least one of the anodic electrode 14 of the anodic chamber 12 of the system 10 and the cathodic electrode 22 of the cathodic chamber 20 of the system 10 comprises graphite or a similar conductive carbon-based material. For example, the conductive carbon-based material may comprise a conductive allotrope of carbon or a conductive composite including carbon. In other embodiments, both the anodic electrode 14 of the anodic chamber 12 of the system 10 and the cathodic electrode 22 of the cathodic chamber 20 of the system 10 comprise graphite or a similar conductive carbon-based material. Because the cathodic electrode 22 does not suffer from ablation during use of the system 10, the cathodic electrode 22 may comprise a material other than graphite, such as a metal or alloy, to minimize costs of the system 10, even when the anodic electrode 14 comprises graphite or a similar conductive carbon-based material.

The system 10 also comprises a membrane 28 disposed between and separating the anodic chamber 12 and the cathodic chamber 20. Generally, the membrane 28 is the only material separating the anodic chamber 12 and the cathodic chamber 20 in the system 10. The membrane 28 of the system 10 may comprise any material capable of allowing ions to pass therethrough, as described in greater detail below. Accordingly, the membrane 28 of the system 10 is typically at least partially porous. However, the membrane 28 of the system 10 typically substantially prevents fluid from passing therethrough. Additionally, the membrane 28 of the system 10 typically comprises a material which is resistant to and which doesn't degrade in the presence of acidic and/or alkaline compounds. The membrane 28 of the system 10 typically comprises a polymeric material. Specific examples of polymeric materials suitable for the purposes of the membrane 28 of the system 10 include, but are not limited to, polyethylene, polypropylene, polyvinylchloride, etc.

In certain embodiments, the anodic chamber 12, the cathodic chamber 20 and the membrane 28 are a single unit that may be removed and replaced in the system 10. In these embodiments, the anodic chamber 12, the cathodic chamber 20 and the membrane 28 may be referred to as a disposable cartridge. Additionally, in these embodiments, the disposable cartridge may be easily replaced within the system 10 for a minimal cost, particularly when the anodic electrode 14 of the anodic chamber 12 and the cathodic electrode 22 of the cathodic chamber 20 comprise graphite.

The system 10 further comprises a brine chamber 30. The brine chamber 30 of the system 10 comprises an anodic electrode 32 and a cathodic electrode 34 spaced from the anodic electrode 32. The brine chamber 30 additionally comprises an inlet 36 for receiving a first aqueous salt solution and an outlet 38, as described in greater detail below. The brine chamber 30 of the system 10 may have a uniform or non-uniform shape and may have any dimensions depending upon the desired size and shape of the system 10. The inlet 36 and the outlet 38 of the brine chamber 30 may have various configurations, shapes, and dimensions. Typically, the outlet 38 of the brine chamber 30 and the inlets 16, 24 of the anodic chamber 12 and the cathodic chamber 20 have substantially identical dimensions. The brine chamber 30 typically comprises a polymeric material, which houses the anodic and cathodic electrodes 32, 34 and defines the inlet 36 and the outlet 38 of the brine chamber 30. The brine chamber 30 may comprise the same polymeric material as the anodic chamber 12 and/or the cathodic chamber 20 or may comprise polymeric material different from the polymeric material of the anodic chamber 12 and/or the cathodic chamber 20. Exemplary examples of the polymeric material of the brine chamber 30 include, but are not limited to, acrylonitrile butadiene styrene (ABS), polystyrene, polyvinylchloride, polycarbonate, etc.

The anodic and cathodic electrodes 32, 34 of the brine chamber 30 of the system 10 may independently comprise any conductive or semi-conductive material. Generally, the anodic and cathodic electrodes 32, 34 of the brine chamber 30 are independently selected from metals, semi-metals, metal alloys, conductive or semi-conductive composites, and combinations thereof. Additionally, the anodic and cathodic electrodes 32, 34 of the brine chamber 30 may be the same as or different from the anodic electrode 14 of the anodic chamber 12 and the cathodic electrode 22 of the cathodic chamber 20. As introduced above, specific examples of exemplary conductive and/or semi-conductive materials suitable for the purposes of the anodic and cathodic electrodes 32, 34 of the brine chamber 30 include, but are not limited to, graphite, titanium, titanium alloys, nickel, nickel alloys, steel, and steel alloys. In certain embodiments, at least one of the anodic and cathodic electrodes 32, 34 of the brine chamber 30 comprises graphite or a similar conductive carbon-based material, with the anodic electrode 32 most typically comprising such a material. For example, the conductive carbon-based material may comprise a conductive allotrope of carbon or a conductive composite including carbon. In other embodiments, both the anodic and cathodic electrodes 32, 34 of the brine chamber 30 comprise graphite or a similar conductive carbon-based material. Because the cathodic electrode 34 does not suffer from ablation during use of the system 10, the cathodic electrode 34 may comprise a material other than graphite, such as a metal or alloy, to minimize costs of the system 10, even when the anodic electrode 32 comprises graphite or a similar conductive carbon-based material.

Typically, the anodic and cathodic electrodes 32, 34 of the brine chamber 30 and the anodic and cathodic electrodes 14, 22 of the anodic and cathodic chambers 12, 20 all comprise graphite or a similar conductive carbon-based material. However, as noted above, the cathodic electrodes 34, 22 of the brine chamber 30 and the cathodic chamber 20 do not suffer from ablation during use of the system 10 such that these cathodic electrodes 34, 22 may comprise materials other than graphite or a similar conductive carbon-based material when the anodic electrodes 32, 14 comprise graphite or a similar conductive carbon-based material. Conventional methods of preparing hypochlorous acid typically employ electrodes comprising titanium or other expensive metals. However, conventional anodes comprising titanium often become coated with scale during use. Conventional methods may reverse current between the conventional anodes and cathodes in an attempt to reduce or minimize such scale, which adds complexity to such methods. Further, not only are conventional anodes that comprise titanium subject to scale buildup, but titanium is incredibly expensive as compared to graphite. Conversely, electrodes comprising graphite typically ablate during use, but do not suffer from scale buildup. In certain embodiments, the anodic electrodes 32, 14 consist essentially of graphite or a similar carbon-based material. By consist essentially of, it is meant that the anodic electrodes 32, 14 comprise graphite or a similar carbon-based material in an amount of at least 50, at least 60, at least 70, at least 80, at least 90, at least 95, or at least 99 percent by weight based on the total weight of the respective electrodes.

In certain embodiments, the brine chamber 30 of the system 10 is a single unit that may be removed and replaced in the system 10. In these embodiments, the brine chamber 30 may also be referred to as a disposable cartridge. Additionally, in these embodiments, the disposable cartridge may be easily replaced within the system 10 for a minimal cost, particularly when the anodic electrode 32 and the cathodic electrode 34 of the brine chamber 30 each comprise graphite. For example, the disposable cartridge may be removed and replaced when the first aqueous salt solution has been consumed by the system 10. For example, as described below, the system 10 may further comprise a brine tank 40, and the brink tank 40 may be included within the disposable cartridge. Typically, when the disposable cartridge is removed from the system to be replaced, the anodic and cathodic chambers 12, 20 remain in the system 10, i.e., the anodic and cathodic chambers 12, 20 are not part of the disposable cartridge, as the anodic and cathodic chambers 12, 20 have an incredibly long lifespan during use of the system 10. However, the anodic and cathodic chambers 12, 20 may be part of the disposable cartridge, or may be part of a disposable cartridge separate and distinct from the disposable cartridge comprising the brine chamber 30. As introduced above, when the anodic and cathodic electrodes 32, 34 of the brine chamber 30 and the cathodic and anodic electrodes 14, 22 of the anodic and cathodic chambers 12, 20 all comprise graphite, the electrodes 14, 22, 32, 34 generally ablate during use of the system 10, but the electrodes 14, 22, 32, 34 may be easily and inexpensively replaced in the system 10 via the disposable cartridge described above.

The outlet 38 of the brine chamber 30 is coupled to and in fluid communication with one of the inlet 16 of the anodic chamber 12 and the inlet 24 of the cathodic chamber 20. The other of the inlet 16 of the anodic chamber 12 and the inlet 24 of the cathodic chamber 20 is for receiving a second aqueous salt solution. As described in greater detail below, the second aqueous salt solution may be the same as or different from the first aqueous salt solution. The chlorine-containing compound is generated in one of said anodic chamber and said cathodic chamber and recovered from one of said outlet of said anodic chamber and said outlet of said cathodic chamber. Fluid flow from the outlet 38 of the brine chamber 30 to the inlet 16, 24 of the anodic or cathodic chambers 12, 20 is typically continuous in real time, i.e., fluid is not diluted or stored as it exits the brine chamber 30 prior to entering the inlet 16, 24 of the anodic or cathodic chambers 12, 20.

As best illustrated in FIG. 1, in one embodiment, the outlet 38 of the brine chamber 30 is coupled to and in fluid communication with the inlet 16 of the anodic chamber 12. In this embodiment, the chlorine-containing compound is generated in the anodic chamber 12 and is recovered from the outlet 18 of the anodic chamber 12. The chlorine-containing compound of this embodiment generally comprises hypochlorous acid, as described in greater detail below. As a by-product from the generation of the hypochlorous acid in the anodic chamber 12, sodium hydroxide is typically generated in the cathodic chamber 20 of the system 10 in this embodiment, which may optionally be recovered and utilized for particular applications or may be discarded or otherwise disposed of. The sodium hydroxide exits the outlet 26 of the cathodic chamber 20 of the system 10 in this particular embodiment. If desired, the sodium hydroxide may be diluted with water prior to disposing of the sodium hydroxide to minimize the potential corrosiveness of the sodium hydroxide. As set forth above, in this embodiment, the inlet 24 of the cathodic chamber 20 is for receiving the second aqueous salt solution.

Figure 2:
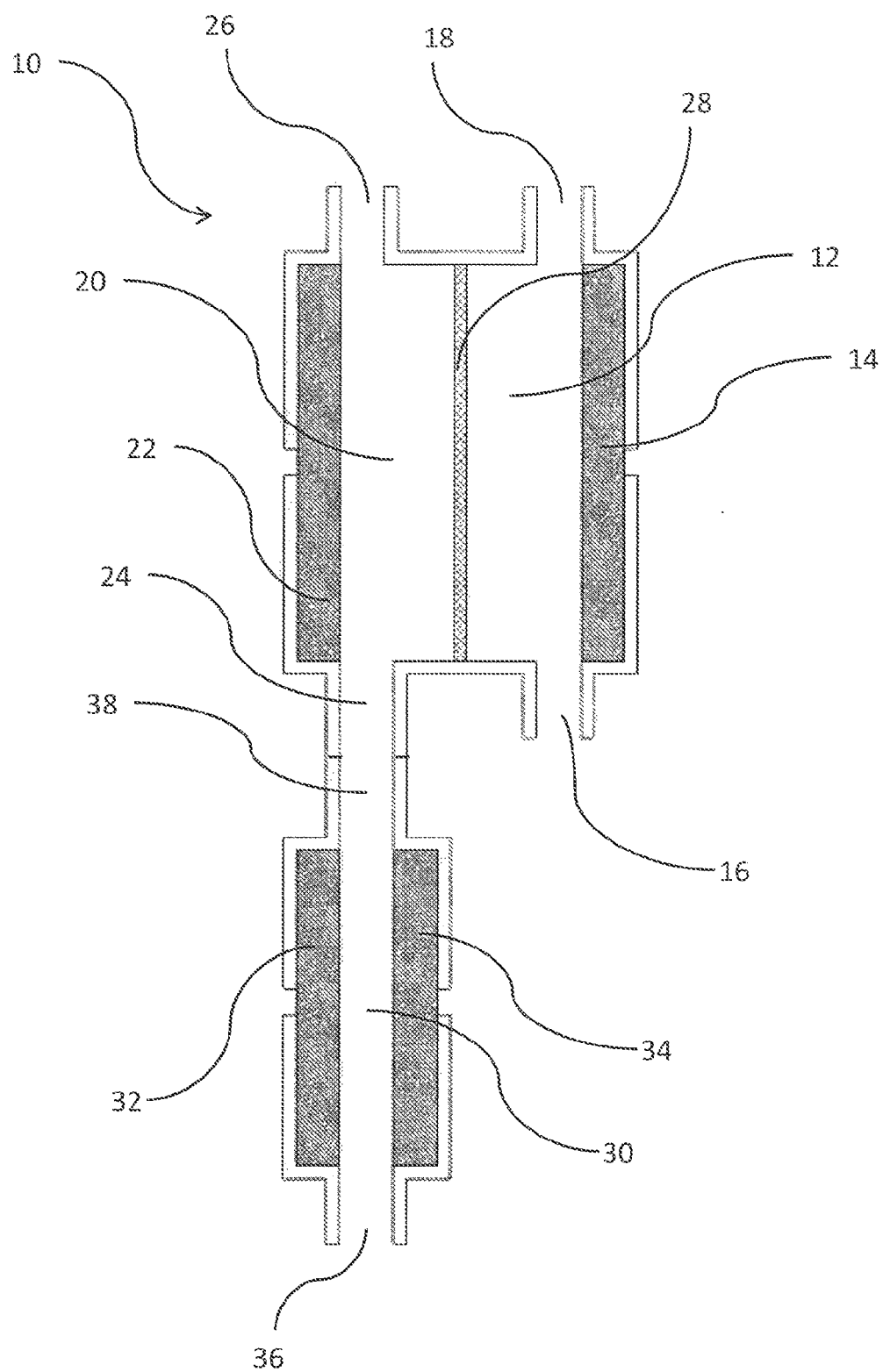
FIG. 2 is schematic view of a second embodiment of the system for generating a chlorine-containing compound according to the present invention.

As best illustrated in FIG. 2, in an alternative embodiment, the outlet 38 of the brine chamber 30 is coupled to and in fluid communication with the inlet 24 of the cathodic chamber 20. In this alternative embodiment, the chlorine-containing compound is generated in the cathodic chamber 20 and is recovered from the outlet 26 of the cathodic chamber 20. The chlorine-containing compound of this embodiment generally comprises sodium hypochlorite, as described in greater detail below. As a by-product from the generation of the sodium hypochlorite in the cathodic chamber 20, hydrochloric acid is typically generated in the anodic chamber 12 of the system 10 in this embodiment, which may optionally be recovered and utilized for particular applications or may be discarded or otherwise disposed of. The hydrochloric acid exits the outlet 18 of the anodic chamber 12 of the system 10 in this particular embodiment. As set forth above, in this embodiment, the inlet 16 of the anodic chamber 12 is for receiving the second aqueous salt solution.

In certain embodiments, the first and second aqueous salt solutions are the same. In particular, the first and second aqueous salt solutions typically comprise a salt dissolved in water. The salt is typically sodium chloride (NaCl), although, as introduced above, the salt may alternatively comprise other chlorine-containing salts, e.g. calcium chloride ($CaCl_2$), magnesium chloride ($MgCl_2$), potassium chloride (KCl), etc., or combinations of such salts. The water is typically de-ionized and/or purified. However, the water is not required to be de-ionized and/or purified. For example, tap water, or water from another source, such as rain water, river water, lake water, etc., may be utilized in the system 10. In certain embodiments, the water is de-ionized and/or purified prior to being utilized in the system 10. In alternative embodiments, the system 10 includes a filter and/or a deionizer. In these alternative embodiments, the system 10 may utilize tap water or other readily available water source yet de-ionize and/or purify this water. The first and second salt solutions typically comprise sodium chloride and/or ions thereof in a concentration of from greater than 0 to 26, more typically from 1 to 17, most typically from 4 to 12, percent by weight based on the total weight of each of the first and second salt solutions, respectively. The first and second salt solutions may comprise different concentrations of sodium chloride and/or ions thereof.

Figure 3:
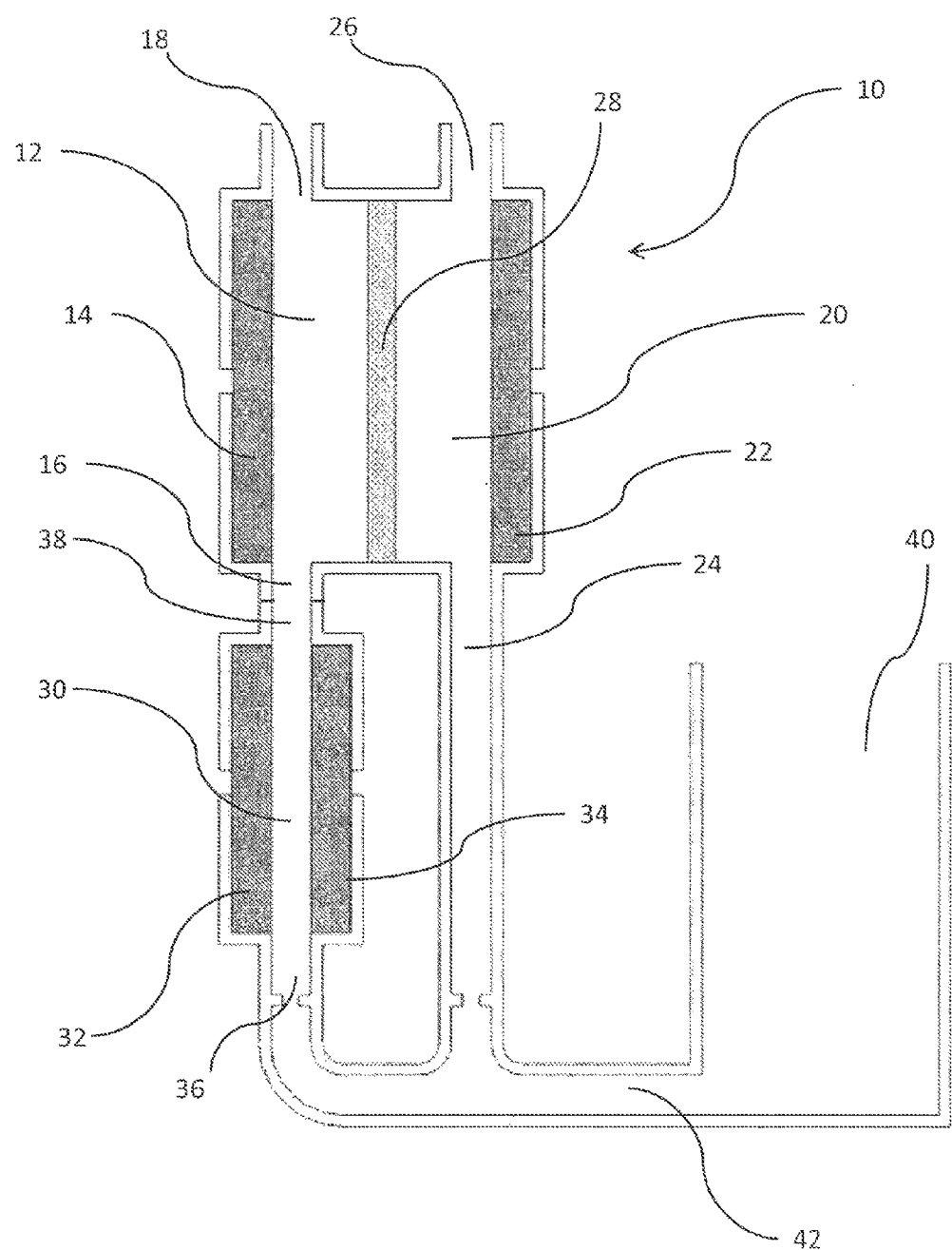
FIG. 3 is a schematic view of a third embodiment of the system for generating a chlorine-containing compound according to the present invention.

In embodiments in which the first and second aqueous salt solutions are the same, the system 10 may further comprise a brine tank 40 for supplying the first and second aqueous salt solutions, as best illustrated in FIG. 3. The brine tank 40 has an outlet 42 coupled to and in fluid communication with the inlet 36 of the brine chamber 30. The outlet 42 of the brine tank 40 is also coupled to and in fluid communication with one of the inlet 16 of the anodic chamber 12 and the inlet 24 of the cathodic chamber 20. Specifically, the outlet 42 of the brine tank 40 is coupled to the inlet 16, 24 which is not coupled to the outlet 38 of the brine chamber 30. Accordingly, in the embodiment represented by FIG. 1, the outlet 42 of the brine tank 40 is coupled to and in fluid communication with the inlet 36 of the brine chamber 30 and the inlet 24 of the cathodic chamber 20. Alternatively, in the embodiment represented by FIG. 2, the outlet 42 of the brine tank 40 is coupled to and in fluid communication with the inlet 36 of the brine chamber 30 and the inlet 16 of the anodic chamber 12.

The system 10 further comprises a first power supply (not shown) coupled to and in electrical communication with the cathodic electrode 22 of the cathodic chamber 20 and the anodic electrode 14 of the anodic chamber 12. Additionally, the system 10 comprises a second power supply (not shown) which is the same as or different from the first power supply. The second power supply is coupled to and in electrical communication with the anodic and cathodic electrodes 32, 34 of the brine chamber 30. Typically, the first and second power supplies direct current between the cathodic electrode 22 of the cathodic chamber 20 and the anodic electrode 14 of the anodic chamber 12 as well as between the anodic and cathodic electrodes 32, 34 of the brine chamber 30. Alternatively, the system 10 may further comprise a rectifier (not shown) such that the system 10 may utilize a standard electrical plug, which supplies alternating current. In these embodiments, the alternating current is converted by the rectifier to direct current, which is then supplied between the cathodic electrode 22 of the cathodic chamber 20 and the anodic electrode 14 of the anodic chamber 12 as well as between the anodic and cathodic electrodes 32, 34 of the brine chamber 30. The first and second power supplies may independently rely on any source of electrical current, such as a battery, a mechanical generator, a photovoltaic cell module, etc.

In certain embodiments, the first and second power supplies are the same such that a single power supply is coupled to and in electrical communication with the cathodic electrode 22 of the cathodic chamber 20, the anodic electrode 14 of the anodic chamber 12 and the anodic and cathodic electrodes 32, 34 of the brine chamber 30.

The second power supply is for applying a potential difference between the anodic and cathodic electrodes 32, 34 of the brine chamber 30 of the system 10. Once the potential difference is applied between the anodic and cathodic electrodes 32, 34 of the brine chamber 30, hydrogen gas ($H_2$) is generally formed at the cathodic electrode 34 of the brine chamber 30. The hydrogen gas often drives flow of the first aqueous salt solution in the brine chamber 30 via convection. Specifically, as the hydrogen gas is generated in the brine chamber 30 of the system, fluid flows from the outlet 38 of the brine chamber 30 to the inlet 16 of the anodic chamber 12 or the inlet 24 of the cathodic chamber, depending upon which inlet 16, 24 is coupled to the outlet 38 of the brine chamber 30. In particular, in certain embodiments, the configuration of the system 10 allows for convection to drive fluid flow throughout the system 10 such that the system is free from components generally utilized in conventional systems, such as metering pumps, which add complexity and cost to such conventional systems. To this end, in certain embodiments, the system 10 is free from any external fluid regulators and metering pumps to induce fluid flow such that the system 10 is free from moving parts or components during use of the system 10 and fluid flow is driven via convection. "External" means any component or device that may be utilized to induce fluid flow other than flow control regulators, or flow orifices, as described below, which are generally integral with the system and which merely restrict fluid flow at certain locations within the system to further drive overall fluid flow. The first and second power supplies and the microprocessor are also outside the scope of "external" as it relates to fluid regulators for inducing fluid flow.

As readily understood by one of skill in the art, the process of applying the potential difference between the anodic and cathodic electrodes 32, 34 of the brine chamber 30 is commonly referred to as electrolysis. During electrolysis in the brine chamber 30, at least some of the salt is converted to sodium hypochlorite (NaClO). As such, the first aqueous salt solution enters the inlet 36 of the brine chamber 30 and an electrolysis product, which comprises water, sodium chloride, sodium and chlorine ions (from dissociation of sodium chloride), sodium hypochlorite, hydrogen gas, chlorine gas, (ClO$^-$) ions, and/or hypochlorous acid exits the outlet 38 of the brine chamber 30.

The potential difference applied between the anodic and cathodic electrodes 32, 34 of the brine chamber 30 by the second power supply may vary with respect to the anodic and cathodic electrodes 32, 34 utilized. In the embodiments in which the anodic and cathodic electrodes 32, 34 of the brine chamber 30 comprise graphite, the potential difference applied between the anodic and cathodic electrodes 32, 34 of the brine chamber 30 is typically from 1 to 20, more typically from 2 to 13, most typically from 4 to 6, volts. The second power supply typically provides a current between the anodic and cathodic electrodes 32, 34 of the brine chamber 30 of from 0.0001 to 5, more typically from 0.1 to 1, most typically from 0.4 to 0.6, amps/cm$^2$.

As noted above, the hydrogen gas (and the chlorine gas, if present) generated in the brine chamber 30 typically drives fluid flow throughout the system 10 via convection. However, in other embodiments, the system 10 may further comprise a fluid regulator (not shown) for precisely and selectively controlling the flow of the first and second aqueous salt solutions, as described in greater detail below. The fluid regulator may be any fluid regulator known to those of skill in the art. For example, the fluid regulator may comprise at least one of a flow control regulator, a pressure regulator, and a metering pump. When the fluid regulator is the flow control regulator, the inlet 36 of the brine chamber 30, the inlet 16 of the anodic chamber 12, and/or the inlet 24 of the cathodic chamber 20 may each independently include such a flow control regulator, or flow orifices, as readily understood in the art. Typically, such flow control regulators or flow orifices are formed contemporaneously with the brine chamber 30, the anodic chamber 12, and/or the cathodic chamber 20. These flow control regulators or flow orifices typically reduce an inner diameter of the inlet 36 of the brine chamber 30, the inlet 16 of the anodic chamber 12, and/or the inlet 24 of the cathodic chamber 20 via protruded polymeric material. The system 10 may also include at least one metering pump and/or at least one pressure regulator for controlling the flow of the first and second aqueous salt solutions.

The first power supply is for applying a potential difference between the anodic electrode 14 of the anode chamber 12 and the cathodic electrode 22 of the cathodic chamber 20 of the system 10. As described in greater detail below, the impact of the application of the potential difference between the anodic electrode 14 of the anode chamber 12 and the cathodic electrode 22 of the cathodic chamber 20 depends upon whether the output 38 of the brine chamber 30 is coupled to the inlet 16 of the anodic chamber 12 or the inlet 24 of the cathodic chamber 20.

The potential difference applied between the anodic electrode 14 of the anode chamber 12 and the cathodic electrode 22 of the cathodic chamber 20 by the first power supply may vary with respect to anodic electrode 14 of the anode chamber 12 and the cathodic electrode 22 of the cathodic chamber 20 utilized. In the embodiments in which the anodic electrode 14 of the anode chamber 12 and the cathodic electrode 22 of the cathodic chamber 20 comprise graphite, the potential difference applied between the anodic electrode 14 of the anode chamber 12 and the cathodic electrode 22 of the cathodic chamber 20 is typically from 1 to 20, more typically from 2 to 13, most typically from 4 to 6, volts. The first power supply typically provides a current between the anodic electrode 14 of the anode chamber 12 and the cathodic electrode 22 of the cathodic chamber 20 of from 0.0001 to 5, more typically from 0.1 to 1, most typically from 0.4 to 0.6, amps/cm$^2$.

In the embodiment best shown in FIG. 1, i.e., in the embodiment in which the outlet 38 of the brine chamber 30 is coupled to the inlet 16 of the anodic chamber 12, hypochlorous acid is generated in the anodic chamber 12. Specifically, as the electrolysis product enters the inlet 16 of the anodic chamber 12, sodium ions from the electrolysis product migrate through the membrane 28 of the system 10 toward the cathodic electrode 22 of the cathodic chamber 20. Similarly, as the second aqueous salt solution enters the inlet 24 of the cathodic chamber 20, chlorine ions migrate through the membrane 28 of the system 10 toward the anodic electrode 14 of the anodic chamber 12. Additionally, the sodium atoms of the sodium hypochlorite of the electrolysis product of the brine chamber 30 migrate through the membrane 28 of the system 10 toward the cathodic electrode 22 of the cathodic chamber 20, and the sodium atom of the sodium hypochlorite is replaced with a hydrogen atom to form hypochlorous acid (NaClO to HClO) in the anodic chamber 12 of the system 10, which exits the outlet 18 of the anodic chamber 12 in solution. The sodium atoms, once migrated through the membrane 28 into the cathodic chamber 20, produce sodium hydroxide (NaOH) in the cathodic chamber 20, which exits the outlet 26 of the cathodic chamber 20 in solution. Hydrogen gas is also produced in the cathodic chamber 20 as the second aqueous salt solution enters the inlet 24 of the cathodic chamber 20, which further contributes to fluid flow via convection in and out of the cathodic chamber 20 of the system 10. Additionally, chlorine gas ($Cl_2$) is generally formed at the anodic electrode 14 of the anodic chamber 12 of the system 10. This chlorine gas may change form dependent upon the pH of the first and/or second aqueous salt solutions. For example, at a relatively low pH, e.g. a pH of from 1 to 4, chlorine gas is generated in the anodic chamber 12 and exits the outlet 18 of the anodic chamber 12. However, at a relatively neutral pH, e.g. a pH of from greater than 4 to 8, the chlorine gas reacts to produce hypochlorous acid in the anodic chamber 12. Further, at a relatively high pH, the chlorine gas generally forms a ($ClO^-$) ion in the anodic chamber 12.

In the embodiment best shown in FIG. 2, i.e., in the embodiment in which the outlet 38 of the brine chamber 30 is coupled to the inlet 24 of the cathodic chamber 20, sodium hypochlorite is generated in the brine chamber 30 and enters the inlet 24 of the cathodic chamber 20. In embodiments in which the chlorine-containing compound comprises sodium hypochlorite, the first power supply is not required to provide the potential difference between the cathodic electrode 22 of the cathodic chamber 20 and the anodic electrode 14 of the anodic chamber 12. In particular, when there is no potential difference applied between the cathodic electrode 22 of the cathodic chamber 20 and the anodic electrode 14 of the anodic chamber 12, the sodium hypochlorite is generated in the brine chamber 30, enters the inlet 24 of the cathodic chamber 20, and exits the outlet 26 of the cathodic chamber 20. In embodiments in which the potential difference is applied between the cathodic electrode 22 of the cathodic chamber 20 and the anodic electrode 14 of the anodic chamber 20, the second aqueous salt solution enters the inlet 16 of the anodic chamber 12, resulting in the production of chlorine gas near the anodic electrode 14, thus contributing to fluid flow via convection in and out of the anodic chamber 12 of the system 10. Additionally, sodium ions present in the second aqueous salt solution in the anodic chamber 12 migrate through the membrane 28 of the system 10 toward the cathodic electrode 22 of the cathodic chamber 20. Similarly, chlorine ions present in the electrolysis product in the cathodic chamber 20 migrate through the membrane 28 of the system toward the anodic electrode 14 of the anodic chamber 12. This migration results in the generation of additional sodium hypochlorite in the cathodic chamber 20, which exits the outlet 26 of the cathodic chamber 20 in solution. The migration of chlorine ions to the anodic chamber 12 of the system results in the generation of hydrochloric acid in the anodic chamber 12, which exits the outlet 18 of the anodic chamber 12. Additionally, chlorine gas (Cl2) is generally formed at the anodic electrode 14 of the anodic chamber 12 of the system 10. This chlorine gas may change form dependent upon the pH of the first and/or second aqueous salt solutions. For example, at a relatively low pH, e.g. a pH of from 1 to 4, chlorine gas is generated in the anodic chamber 12 and exits the outlet 18 of the anodic chamber 12. However, at a relatively neutral pH, e.g. a pH of from greater than 4 to 8, the chlorine gas reacts to produce hypochlorous acid in the anodic chamber 12. Further, at a relatively high pH, the chlorine gas generally forms a ($ClO—$) ion in the anodic chamber 12.

In certain embodiments, the system 10 further comprises a microprocessor (not shown) coupled to and in electrical communication with at least one of the first and second power supplies. The microprocessor may be any microprocessor known in the art which is capable for receiving and/or sending electronic data. As readily understood in the art, the microprocessor may be a part of a circuit control board, which may be programmed. Typically, as set forth above, the first and second power supplies are the same such that the microprocessor is coupled to and in electrical communication with both the first and second power supplies. The microprocessor of the system 10 measures the amperage and/or potential difference between the anodic and cathodic electrodes 32, 34 of the brine chamber 30 and/or between the anodic electrode 14 of the anodic chamber 12 and the cathodic electrode 22 of the cathodic chamber 20. Generally, the microprocessor of the system measures the amperage and potential difference between the anodic and cathodic electrodes 32, 34 of the brine chamber 30 and between the anodic electrode 14 of the anodic chamber 12 and the cathodic electrode 22 of the cathodic chamber 20 in real time.

Accordingly, in response to measuring in real time the amperage and potential difference between the anodic and cathodic electrodes 32, 34 of the brine chamber 30 and between the anodic electrode 14 of the anodic chamber 12 and the cathodic electrode 22 of the cathodic chamber 20, the microprocessor can selectively control the amperage and/or the potential difference between the anodic and cathodic electrodes 32, 34 of the brine chamber 30 and/or between the anodic electrode 14 of the anodic chamber 12 and the cathodic electrode 22 of the cathodic chamber 20. This is generally referred to as a feedback loop. Such selective controlling of the amperage and/or the potential difference between the anodic and cathodic electrodes 32, 34 of the brine chamber 30 and/or between the anodic electrode 14 of the anodic chamber 12 and the cathodic electrode 22 of the cathodic chamber 20 allows for consistency with respect to the concentration and consistency of the chlorine-containing compound generated via the system 10. Additionally, in embodiments including the fluid regulator introduced above, the microprocessor may be coupled to and in electrical communication with the fluid regulator for selectively controlling flow rates in and out of the brine chamber 30, the anodic chamber 12 and the cathodic chamber 20. However, certain fluid regulators, e.g. flow control regulators, do not require electrical communication and need not be in electrical communication with the microprocessor.

For example, in conventional systems for generating hypochlorous acid, the free available chlorine (FAC) and oxidative reduction potential (ORP) of the hypochlorous acid generated by the conventional systems deviates and a consistent output is incredibly difficult. However, the system 10 of the present invention allows for selectively controlling the parameters of the system 10 in real time, such as amperage and potential difference, as well as corresponding pH values, such that the free available chlorine (FAC) and oxidative reduction potential (ORP) of the chlorine-containing compound are consistent. In contrast, the conventional systems utilized various sensors and valves for measuring these physical properties of the chlorine-containing compounds after production such that many iterations, or batches, were necessary to achieve desired free available chlorine (FAC) and/or oxidative reduction potential (ORP) values.

In particular, in embodiments in which the chlorine-containing compound comprises hypochlorous acid, the hypochlorous acid generated by the system 10 may be selectively controlled such that the hypochlorous acid generated in either consecutive batch processes or as measured as different times during a continuous process has free available chlorine (FAC) values within 20, typically within 15, more typically within 10, most typically within 5, 4, 3, 2 or 1% of one another. Similarly, in these embodiments, the hypochlorous acid generated by the system 10 may be selectively controlled such that hypochlorous acid generated in either consecutive batch processes or as measured as different times during a continuous process has oxidative reduction potential (ORP) values within 20, typically within 15, more typically within 10, most typically within 5, 4, 3, 2 or 1% of one another.

Moreover, the system 10 of the present invention generates the chlorine-containing compound in a desirable concentration exceeding the concentration generated via conventional systems. In particular, in embodiments in which the chlorine-containing compound comprises hypochlorous acid, the hypochlorous acid generated by the system 10 has a free available chlorine (FAC) value of from at least one to 22,000 ppm. More specifically, in when the hypochlorous acid is produced continuously, the hypochlorous acid generated by the system 10 typically has a free available chlorine (FAC) value of from 50 to 5,000, more typically from 500 to 4,000, most typically from 1,000 to 3,000, ppm. In these embodiments, the hypochlorous acid is typically diluted within the system 10 to provide a hypochlorous acid solution having a free available chlorine (FAC) value of from 400 to 700, more typically from 450 to 650, most typically from 500 to 600, ppm. However, as understood in the art, the hypochlorous acid generated by the system 10 may be diluted to reduce the free available chlorine (FAC) value thereof, dependent upon the application in which the hypochlorous acid is utilized. The hypochlorous acid generated by the system 10 typically has an oxidative reduction potential (ORP) of from 100 to 1200 mV. In particular, the hypochlorous acid generated by the system 10 has an oxidative reduction potential (ORP) of at least 300, typically at least 600, more typically at least 900, mV.

Further, the microprocessor may be programmed such that the chlorine-containing compound may be generated in a batch process or in a continuous process, i.e., on demand.

Figure 4:
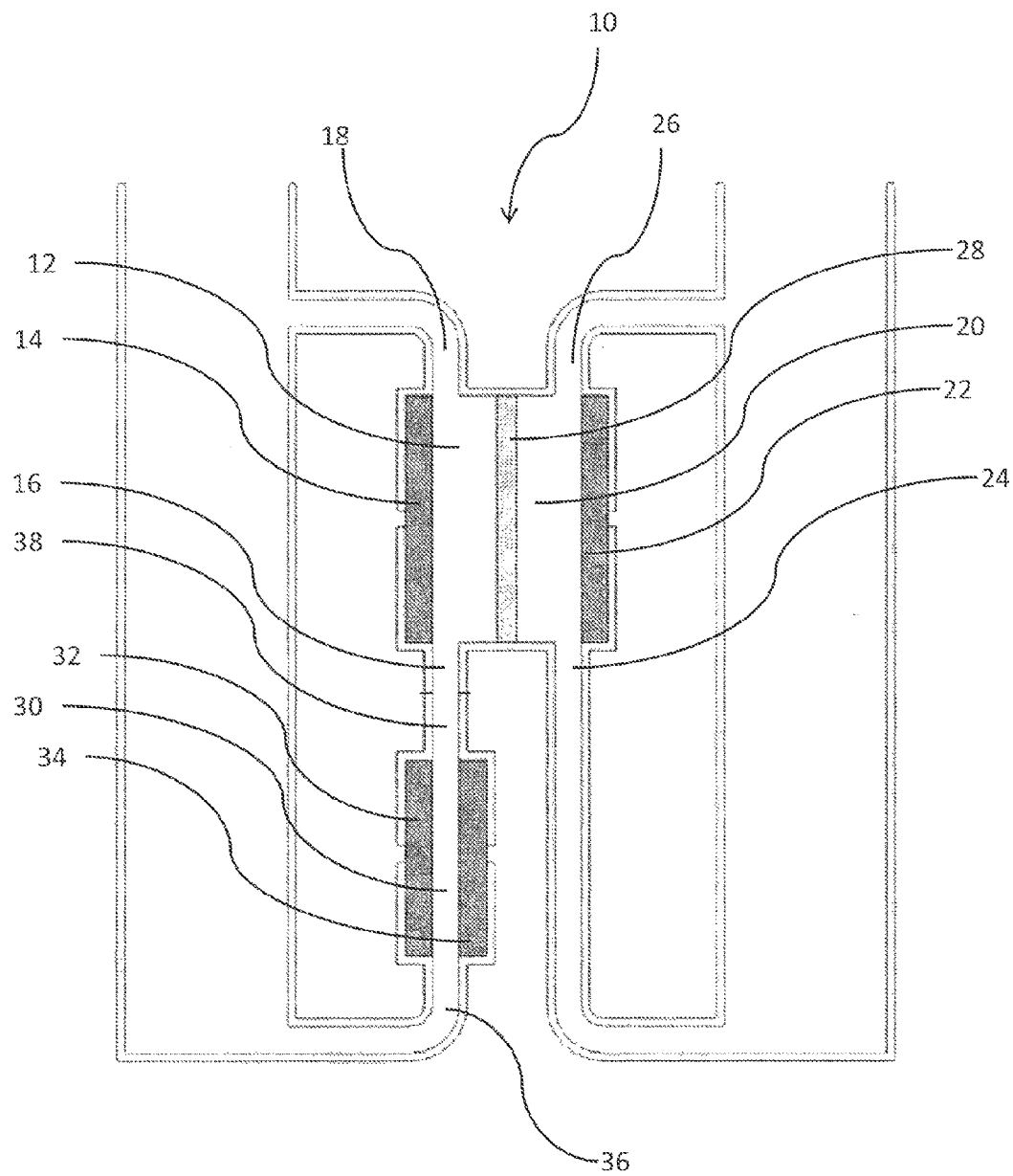
FIG. 4 is a schematic view of a fourth embodiment of the system for generating a chlorine-containing compound according to the present invention.

As best illustrated in FIG. 4, in certain embodiments, the system 10 utilizes recycle loops to further increase a concentration of the chlorine-containing compound generated by the system 10. For example, in FIG. 4, which illustrates an alternative embodiment in which the outlet 38 of the brine chamber 30 is coupled to the inlet 16 of the anodic chamber 12, the outlets 18, 26 of the anodic chamber 12 and the cathodic chamber 20 are recirculated. In particular, the outlet 18 of the anodic chamber 12 is recirculated to the inlet 36 of the brine chamber 30 and the outlet 26 of the cathodic chamber 20 is recirculated to the inlet 24 of the cathodic chamber. These embodiments are particularly suitable for producing hypochlorous acid in batch form. Recirculation allows for continuously increasing a concentration of the hypochlorous acid. In particular, in these embodiments, the hypochlorous acid generated by the system 10 has a free available chlorine (FAC) value of at least 500, typically at least 1,000, more typically at least 2,000, most typically at least 3,000, ppm. In these embodiments, the hypochlorous acid generated by the system 10 has an oxidative reduction potential (ORP) of from 100 to 1200 mV. In particular, the hypochlorous acid generated by the system 10 has an oxidative reduction potential (ORP) of at least 300, typically at least 600, more typically at least 900, mV. The free available chlorine (FAC) and the oxidative reduction potential (ORP) of the hypochlorous acid may deviate from the values set forth immediately above depending upon a duration in which the system 10 is generating the hypochlorous acid and recycling the outlets 18, 26 of the anodic chamber 12 and the cathodic chamber 20. Additionally, depending upon the application in which the hypochlorous acid is to be utilized, the hypochlorous acid may be diluted with water to reduce the free available chlorine (FAC) values thereof.

The present invention also provides a method of generating the chlorine-containing compound in the system 10. The method comprises the step of applying an electric potential difference between the anodic electrode 14 of the anodic chamber 12 and the cathodic electrode 22 of the cathodic chamber 20 via the first power supply. The method further comprises the step of applying an electric potential difference between the anodic and cathodic electrodes 32, 34 of the brine chamber 30 via the second power supply. Finally, the method optionally comprises the step of measuring and/or controlling amperage and/or potential difference between the anodic and cathodic electrodes 32, 34 of the brine chamber 30 and/or between the anodic electrode 14 of the anodic chamber 12 and the cathodic electrode 22 of the cathodic chamber 20 via the microprocessor to generate the chlorine-containing compound.

The steps of applying the electric potential difference between the anodic electrode 14 of the anodic chamber 12 and the cathodic electrode 22 of the cathodic chamber 20 and between the anodic and cathodic electrodes 32, 34 of the brine chamber 30 are typically carried out by pressing a single button, which completes a circuit to power the first and second power supplies to produce the chlorine-containing compound. However, the step of applying the electric potential difference between the anodic electrode 14 of the anodic chamber 12 and the cathodic electrode 22 of the cathodic chamber 20 and between the anodic and cathodic electrodes 32, 34 of the brine chamber 30 may be carried out in any ways known to those of skill in the art.

The chlorine-containing compounds may be collected from the system 10 and utilized for future use or may be utilized as they are produced by the system 10. The system and the fluids therein may optionally be cooled during production of the chlorine-containing compound, and the chlorine-containing compound may optionally be cooled if stored for future use to increase its shelf-life.

The system 10 of the present invention generates chlorine-containing compounds having excellent physical properties that may be utilized in diverse applications. Typically, the chlorine-containing compound is utilized for disinfecting and/or sanitizing a substrate. The substrate may be any substrate, such as a surgical tool, a counter-top, skin, etc. For example, in embodiments in which the chlorine-containing compound generated by the system comprises hypochlorous acid, the hypochlorous acid may be utilized in food processing applications, restaurants, hotels, fitness centers, homes, schools, correctional facilities, military institutions, hospitals, medical offices (e.g. dental or physician offices), assisted living facilities, and water treatment applications.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

The following examples are intended to illustrate the invention and are not to be viewed in any way as limiting to the scope of the invention.

EXAMPLES

Example 1

In Situ Hypochlorous Acid Generation

A system includes a disposable cartridge contains salt, electrodes, flow restrictors, and small circuit board to record cartridge usage. When a single button is pressed, water regulated to a pressure of 5 PSI enters the cartridge. The pressure causes a flow of fluids mixing by volume, 1 part saturated salt brine and 2 parts water. This solution is then split to flow 75% of this mixture through the brine chamber and anodic chamber, which is coupled to the brine chamber. The other 25% of flow is diverted through the cathodic chamber. After exiting the anodic chamber, the solution is divided volumetrically 1 part to 2 parts water to be delivered to the spout for use. The cathodic chamber flow is diluted 1 part to 3 parts water before being disposed. A yellow light on the unit indicates that the solution should not yet be used. For 2 seconds the system is allowed to purge, after which power is applied to the lower cell. A microcontroller of the circuit board attempts to close loop current while monitoring voltage. Once the current and potential difference are in operating range across the anodic and cathodic electrodes of the brine chamber, power is applied to the upper cell, which includes the cathodic and anodic chambers. Once both cells are in electrical operating range for an additional 2 seconds, the yellow light shuts off and a green light turns on. This green light indicates that the solution is ready to collect. Once the button is released, a bottle may be placed under the spout to collect the hypochlorous acid solution. The process is automatically shut off after a predetermined time to fill the bottle. After many bottles of solution have been made, the cartridge will run out of salt. This will be indicated by a red light and stop more solution from being created. By opening a door and installing a replacement cartridge, the system is renewed for further use. The hypochlorous acid solution has a free available chlorine (FAC) value of about 500 ppm at pH of from about 5.5 to 7.

Example 2

Batch Hypochlorous Acid Generation

A system includes an anodic tank connected to a brine chamber and an anodic chamber. A cathodic tank is connected to the cathodic chamber. The system is operated for 30 minutes so that the solution in the anodic tank has been recirculated to gradually increase hypochlorous acid concentration. Once a batch is complete, the hypochlorous acid solution is immediately dispensed into containers. The containers may optionally be cooled to increase a shelf life of the hypochlorous acid.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method of generating a chlorine-containing compound in a system which comprises an anodic chamber comprising an anodic electrode and having an inlet and an outlet; a cathodic chamber spaced from and adjacent the anodic chamber, the cathodic chamber comprising a cathodic electrode and having an inlet and an outlet; a membrane disposed between and separating the anodic chamber and the cathodic chamber; wherein the anodic chamber, the cathodic chamber, and the membrane are a single unit that can be removed and replaced in the system and wherein the cathodic and anodic electrodes independently comprise graphite; a brine chamber having an anodic electrode and a cathodic electrode spaced from the anodic electrode, the brine chamber having an inlet for receiving a first aqueous salt solution and an outlet; a first power supply coupled to and in electrical communication with the cathodic electrode of the cathodic chamber and the anodic electrode of the anodic chamber; a second power supply which is the same as or different from the first power supply, the second power supply being coupled to and in electrical communication with the anodic and cathodic electrodes of the brine chamber; and optionally a microprocessor coupled to and in electrical communication with at least one of the first and second power supplies; wherein the outlet of the brine chamber is coupled to and in fluid communication with one of the inlet of the anodic chamber and the inlet of the cathodic chamber; wherein the other of the inlet of the anodic chamber and the inlet of the cathodic chamber is for receiving a second aqueous salt solution the same as or different from the first aqueous salt solution; and wherein the chlorine-containing compound is generated in one of the anodic chamber and the cathodic chamber and recovered from one of the outlet of the anodic chamber and the outlet of the cathodic chamber; said method comprising the steps of:

applying an electric potential difference between the anodic electrode of the anodic chamber and the cathodic electrode of the cathodic chamber via the first power supply;

applying an electric potential difference between the anodic and cathodic electrodes of the brine chamber via the second power supply;

measuring and controlling amperage between the anodic and cathodic electrodes of the brine chamber and/or between the anodic electrode of the anodic chamber and the cathodic electrode of the cathodic chamber to generate the chlorine-containing compound; and removing and replacing the anodic chamber, the cathodic chamber, and the membrane as the single unit from the system such that the system is renewed for further use.

2. A method as set forth in claim 1 wherein the outlet of the brine chamber is coupled to and in fluid communication with the inlet of the anodic chamber such that the chlorine-containing compound is generated in the anodic chamber and recovered from the outlet of the anodic chamber and wherein the chlorine-containing compound comprises hypochlorous acid.

3. A method as set forth in claim 2 wherein the hypochlorous acid has a free available chlorine (FAC) value of from 50 to 5,000 ppm.

4. A method as set forth in claim 2 wherein sodium hydroxide is generated in the cathodic chamber and is optionally recovered from the outlet of the cathodic chamber.

5. A method as set forth in claim 1 wherein the outlet of the brine chamber is coupled to and in fluid communication with the inlet of the cathodic chamber such that the chlorine-containing compound is generated in the cathodic chamber and wherein the chlorine-containing compound comprises sodium hypochlorite.

6. A method as set forth in claim 5 wherein hydrochloric acid is generated in the anodic chamber and is optionally recovered from the outlet of the anodic chamber.

7. A method as set forth in claim 1 wherein the system further comprises a fluid regulator comprising at least one of a flow control regulator, a pressure regulator, and a metering pump, and wherein said method further comprises the step of controlling flow rate of at least one of the first aqueous salt solution and the second aqueous salt solution.

8. A method as set forth in claim 1 wherein the system is free from any external fluid regulators and/or metering pumps to induce fluid flow such that the system is free from moving parts or components during use of the system and fluid flow is driven via convection.

\* \* \* \* \*